US012335412B2

(12) United States Patent
Osborn et al.

(10) Patent No.: US 12,335,412 B2
(45) Date of Patent: Jun. 17, 2025

(54) SYSTEMS AND METHODS FOR SCALABLE CRYPTOGRAPHIC AUTHENTICATION OF CONTACTLESS CARDS

(71) Applicant: Capital One Services, LLC, McLean, VA (US)

(72) Inventors: Kevin Osborn, Newton Highlands, MA (US); Samuel Patrick Edwards, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/353,556

(22) Filed: Jun. 21, 2021

(65) Prior Publication Data

US 2022/0407724 A1    Dec. 22, 2022

(51) Int. Cl.
*H04L 9/32* (2006.01)
*H04L 9/14* (2006.01)
(Continued)

(52) U.S. Cl.
CPC ............. *H04L 9/3271* (2013.01); *H04L 9/30* (2013.01); *H04L 63/0435* (2013.01); *H04L 63/0492* (2013.01); *H04L 9/14* (2013.01)

(58) Field of Classification Search
CPC ..... H04L 9/3271; H04L 9/30; H04L 63/0435; H04L 63/0492; H04L 9/14
See application file for complete search history.

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Farid Homayounmehr
*Assistant Examiner* — Brian William Avery
(74) *Attorney, Agent, or Firm* — KDW Firm PLLC; Andrew D. Kasnevich

(57) ABSTRACT

Systems and methods for authentication may include an authentication server. The authentication server may include a processor and a memory. The processor may be configured to transmit an authentication request. The processor may be configured to receive a first response that is responsive to the authentication request, the first response comprising a first cryptogram. The processor may be configured to generate a first challenge based on the first response. The processor may be configured to encrypt the first challenge with a symmetric key. The processor may be configured to transmit the first challenge receive a second response that is responsive to the first challenge, the second response comprising a second cryptogram. The processor may be configured to authenticate the second response.

20 Claims, 7 Drawing Sheets

(51) Int. Cl.
    *H04L 9/30*      (2006.01)
    *H04L 9/40*      (2022.01)

(56)         References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,592,553 | A | 1/1997 | Guski et al. |
| 5,616,901 | A | 4/1997 | Crandall |
| 5,666,415 | A | 9/1997 | Kaufman |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,853,788 | B2 * | 12/2010 | Fascenda .............. H04W 12/06 713/168 |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Mamdani et al. |
| 8,005,426 | B2 | 8/2011 | Huomo et al. |
| 8,010,405 | B1 | 8/2011 | Bortolin et al. |
| RE42,762 | E | 9/2011 | Shin |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |
| 8,285,329 | B1 | 10/2012 | Zhu |
| 8,302,872 | B2 | 11/2012 | Mullen |
| 8,312,519 | B1 | 11/2012 | Bailey et al. |
| 8,316,237 | B1 | 11/2012 | Felsher et al. |
| 8,332,272 | B2 | 12/2012 | Fisher |
| 8,365,988 | B1 | 2/2013 | Medina, III et al. |
| 8,369,960 | B2 | 2/2013 | Tran et al. |

(56) References Cited

U.S. PATENT DOCUMENTS

| | | |
|---|---|---|
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Shankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van OS et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |

(56) References Cited

U.S. PATENT DOCUMENTS

| | | |
|---|---|---|
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0298027 A1 | 10/2014 | Roberts et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |

(56) References Cited

U.S. PATENT DOCUMENTS

| | | |
|---|---|---|
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0295404 A1* | 10/2016 | Gouget ............... H04L 63/0876 |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302226 A1* | 10/2018 | Heimlicher ........... H04L 63/061 |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0104841 A1* | 4/2020 | Osborn ................. H04L 9/0631 |
| 2021/0209606 A1* | 7/2021 | Herlands ................ G06F 21/32 |
| 2022/0237281 A1* | 7/2022 | Best ....................... H04L 63/08 |
| 2022/0284178 A1* | 9/2022 | Rule ...................... G06F 21/35 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

(56) References Cited

OTHER PUBLICATIONS

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 19, 2025]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Ma. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared- : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon at Mauritius [online] [retrieved on Mra. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, Mobicom. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

(56) References Cited

OTHER PUBLICATIONS

International Search Report and the Written Opinion of the International Searching Authority issued in related PCT Application No. PCT/US2022/033729 mailed Sep. 28, 2022, 15 pages.

\* cited by examiner

SYSTEMS AND METHODS FOR SCALABLE CRYPTOGRAPHIC AUTHENTICATION OF CONTACTLESS CARDS

FIELD OF THE DISCLOSURE

The present disclosure relates to systems and methods for scalable cryptographic authentication of contactless cards.

BACKGROUND

Card-based transactions are becoming increasingly common. These transactions often involve the use of a card in communication with a point of sale device, a server, or other device. It is necessary to protect such communications from interception and unauthorized access.

However, transmission of data without encryption or other protection is susceptible to phishing attacks, and replay attacks, and may be subject to other vulnerabilities, resulting in increased security risks and increased risks of account or card misuse. These risks may be further increased through the use of contactless cards, which communicate with other devices wirelessly.

Measures taken to address security risk may consume system resources and hinder operational efficiency. For large numbers of transactions, the consumption of system resources and the hindrance of transaction efficiency can increase, which may result in a failure to perform transactions or unsatisfactory performance.

These and other deficiencies exist. Accordingly, there is a need for systems and methods for authentication that overcome these deficiencies by protecting communications from interception and unauthorized access in a secure and reliable manner.

SUMMARY OF THE DISCLOSURE

Embodiments of the present disclosure provide an authentication server. The authentication server may include a processor and a memory. The processor may be configured to transmit an authentication request. The processor may be configured to receive a first response that is responsive to the authentication request, the first response comprising a first cryptogram. The processor may be configured to generate a first challenge based on the first response. The processor may be configured to encrypt the first challenge with a symmetric key. The processor may be configured to transmit the first challenge receive a second response that is responsive to the first challenge, the second response comprising a second cryptogram. The processor may be configured to authenticate the second response.

Embodiments of the present disclosure provide a method of authentication. The method may include transmitting an authentication request. The method may include receiving a first response that is responsive to the authentication request, the first response comprising a first cryptogram. The method may include generating a first challenge based on the first response. The method may include encrypting the first challenge with a symmetric key. The method may include transmitting the first challenge. The method may include receiving a second response that is responsive to the first challenge, the second response comprising a second cryptogram. The method may include authenticating the second response.

Embodiments of the present disclosure provide a computer readable non-transitory medium comprising computer executable instructions that, when executed on a processor, perform procedures comprising the steps of: transmitting an authentication request; receiving a first response that is responsive to the authentication request, the first response comprising a first cryptogram; generating a first challenge based on the first response; encrypting the first challenge with a symmetric key; transmitting the first challenge; receiving a second response that is responsive to the first challenge, the second response comprising a second cryptogram; and authenticating the second response.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Benefits of the systems and methods disclosed herein include improved authentication by protecting communications from interception and unauthorized access. The systems and methods disclosed herein allow for the avoidance of phishing attacks, preventing replay attacks through encrypted data communications, and the reduction of other security vulnerabilities.

In addition, challenges may be generated and corresponding responses may be transmitted via customized commands to improve authentication. By doing so, security risks can be further mitigated and transaction efficiency can be improved.

These features can be implemented without degrading the user experience by burdening the user with unnecessary security tasks. Further, these features can be performed in a manner that allows for the time-efficient performance of transactions, in order to comply with user expectations and transaction requirements.

Additionally, the systems and methods described herein are scalable, allowing for use with a large number of transactions. By doing so, large numbers of transactions can be performed in a timely and satisfactory manner, while maintaining transaction efficiency and efficient use of system resources.

Accordingly, the systems and methods disclosed herein reduce the risk of fraudulent activity, such as misuse of the card or an account associated with the card, and address authentication implementations that lack scalability, while promoting transaction efficiency and avoiding degradation of the user experience. Unlike conventional systems that rely on using a limited number of random keys and a successful registration, the systems and methods disclosed herein allow for producing and reproducing a significant number, such as in the millions, of keys by using key diversification. Furthermore, card issuance advantageously provides information relevant for identification and authentication.

Figure 1:
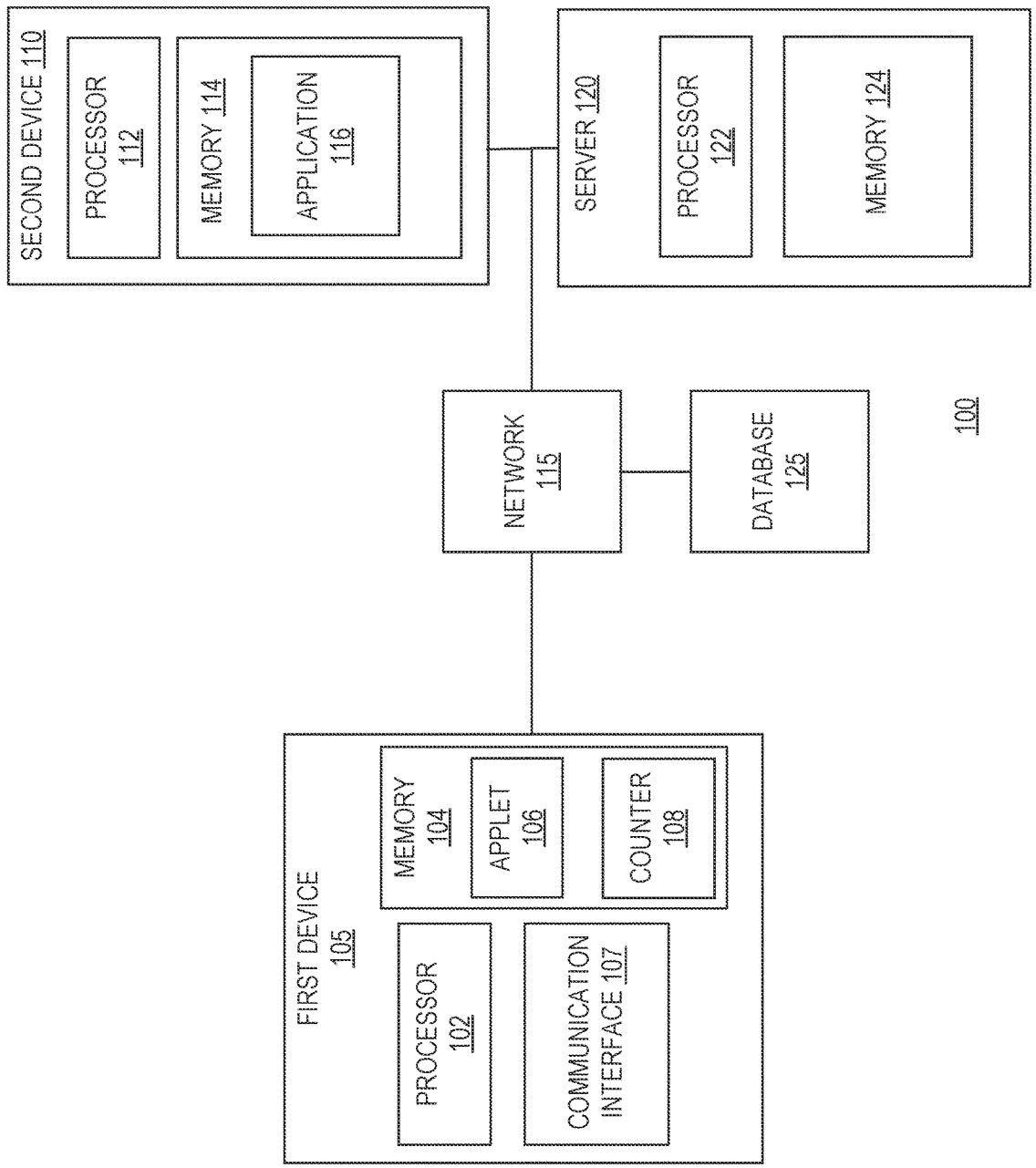
FIG. 1 depicts an authentication server according to an exemplary embodiment.

FIG. 1 illustrates an authentication system 100. The system 100 may comprise a first device 105, a second device 110, a network 115, a server 120, and a database 125. Although FIG. 1 illustrates single instances of components of system 100, system 100 may include any number of components.

System 100 may include a first device 105. The first device 105 may comprise a contactless card, a contact-based card, a network-enabled computer, or other device described herein. As referred to herein, a network-enabled computer may include, but is not limited to a computer device or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, and at least one key.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as NFC, Bluetooth, Wi-Fi, RFID, and other forms of contactless communication. As shown in FIG. 1, the communication interface 107 may be configured to communicate directly with the second device 110, server 120, and/or database 125 via network 115.

First device 105 may be in data communication with any number of components of system 100. For example, first device 105 may transmit data via network 115 to second device 110, and/or server 120. First device 105 may transmit data via network 115 to database 125. In some examples, first device 105 may be configured to transmit data via network 115 after entry into one or more communication fields of any device. Without limitation, each entry may be associated with a tap, a swipe, a wave, and/or any combination thereof.

System 100 may include a second device 110. The second device 110 may include one or more processors 112, and memory 114. Memory 114 may include one or more applications, including but not limited to application 116. Second device 110 may be in data communication with any number of components of system 100. For example, second device 110 may transmit data via network 115 to server 120. Second device 110 may transmit data via network 115 to database 125. Without limitation, second device 110 may be a network-enabled computer. Second device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 115. In some examples, network 115 may be one or more of a wireless network, a wired network or any combination of wireless network and wired network, and may be configured to connect to any one of components of system 100. For example, first device 105 may be configured to connect to server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors 122 coupled to memory 124. Server 120 may be configured as a central system, server or platform to control and call various data at different times to execute a plurality of workflow actions. Server 120 may be configured to connect to first device 105. Server 120 may be in data communication with the applet 106 and/or application 116. For example, a server 120 may be in data communication with applet 106 via one or more networks 115. First device 105 may be in communication with one or more servers 120 via one or more networks 115, and may operate as a respective front-end to back-end pair with server 120. First device 105 may transmit, for example from applet 106 executing thereon, one or more requests to server 120. The one or more requests may be associated with retrieving data from server 120. Server 120 may receive the one or more requests from first device 105. Based on the one or more requests from applet 106, server 120 may be configured to retrieve the requested data. Server 120 may be configured to transmit the received data to applet 106, the received data being responsive to one or more requests.

In some examples, server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 may include an application comprising instructions for execution thereon. For example, the application may comprise instructions for execution on the server 120. The application of the server 120 may be in communication with any components of system 100. For example, server 120 may execute one or more applications that enable, for example, network and/or data communications with one or more components of system 100 and transmit and/or receive data. Without limitation, server 120 may be a network-enabled computer. Server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by applet 106. Server 120 may be configured to transmit the received data from database 125 to applet 106 via network 115, the received data being responsive to the transmitted one or more requests. In other examples, applet 106 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, second device 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The server 120 may be configured to transmit a first request. For example, the first request may comprise an authentication request. The application 116 of the client device 110 may be configured to receive the first request. The application 116 of the client device 110 may be configured to conduct one or more reads of the first device 105, such as the card. For example, the application 116 may be configured to conduct a read, such as a near field communication read, of a tag of the card 105.

The one or more processors 102 of card 105 may be configured to create a cryptogram using at least one key and a counter value. The cryptogram may include the counter value and the transmission data. The one or more processors 102 of card 105 may be configured to transmit the first cryptogram. The one or more processors 102 of card 105 may be configured to transmit, after entry into one or more communication fields of any device, data responsive to the read, such as a first read. For example, the one or more processors 102 of card 105 may be configured to transmit, after a first entry into a first communication field of the device, the first cryptogram. Without limitation, each entry may be associated with a tap, a swipe, a wave, and/or any combination thereof. The first cryptogram may be received, upon request, via a near field communication data exchange format (NDEF) read. The one or more processors 102 of card 105 may be configured to transmit the first cryptogram. The application 116 of the client device 110 may be configured to receive the first cryptogram and a public key from a response transmitted by the one or more processors 102 of the card 105. In some examples, the one or more processors 102 of the card 105 may be configured to generate and transmit, to the application 116 of the client device 110, the first cryptogram using a shared secret. In some examples, the response may comprise a first response. The first response may be generated based on a first read of the tag of the card 105. The first response may also comprise a version number associated with the card 105. In some examples, the one or more processors 102 of the card 105 may be configured to encrypt the first cryptogram prior to its transmission. For example, the first response may include any combination of a unique identifier of the card 105, a counter 108, a version number of the card 105 that allows for changes in the one or more cryptographic algorithms used, and the first cryptogram that serves as a Message Authentication Code (MAC). In some examples, the first response may comprise a public key digital signature. In other examples, the first response may comprise a MAC inside encrypt structure using one or more symmetric, or derived session, keys. For example, the card 105 may be configured to generate a plurality of session keys, such as a first session key and a second session key, using secret keys combined with the counter 108 of the card 105. The MAC may be generated with the first session key. The MAC may be encrypted with the second session key prior to its transmission for decryption and validation. In some examples, if a public key is also used for subsequent challenge validation, such as challenge validation by the server 120, the public key may be transmitted by the card 105 in the clear or unencrypted, or alternatively the public key may be encrypted along with the MAC prior to transmission from the card 105. In addition, the message used in MAC construction may also include one or more shared secrets for further security. The server 120 may be configured to generate unique derived keys using the unique identifier and master keys. The server 120 may be configured to generate session keys from the unique derived keys and the counter. The server 120 may be configured to decrypt the encrypted MAC from the first cryptogram. The server 120 may be configured to validate the MAC using the session key.

The one or more processors 102 may be configured to transmit the first cryptogram via the communication interface 107. For example, the one or more processors 102 may be configured to transmit the first cryptogram to one or more applications. In some examples, the one or more processors 102 may be configured to transmit the first cryptogram to an application 116 comprising instructions for execution on a second device 110. The one or more processors 102 may be configured to update the counter value after transmission of the first cryptogram.

In some examples, the server 120 may be configured to receive the first cryptogram and the public key from a response transmitted by the one or more processors 102 of card 105. The application 116 of the client device 110 may be configured to transmit the first cryptogram and the public key from the response by the card 105 to the server 120. The server 120 may be configured to decrypt the first cryptogram.

The server 120 may be configured to, based on the first response, generate a first challenge. The server 120 may be configured to encrypt the first challenge with a key, such as a symmetric key. The server 120 may be configured to transmit the encrypted first challenge to the application 116 of the client device 110. In some examples, the server 120 may be configured to transmit the encrypted first challenge based on the version number received from the card 105 or the application 116 of the device 110. Moreover, the server 120 may be configured to generate a random number, such as a secret salt, that is associated with a transaction and also included with the transmitted first challenge. The random number may be generated by the server 120 and may be unique for each transaction. For example, the random number may comprise a string of bits with high entropy. In some examples, the random number may serve as an additional component in the MAC calculation, and include any length. In other examples, the random number may be the same length as the message for combining, such as the one or more logical operations including but not limited to, AND, OR, XOR, NOT.

The first challenge may be associated with a first predetermined time duration. Thus, the first challenge may be time-limited. For example, the server 120 may be configured to generate, after expiration of the first predetermined time duration, one or more additional challenges that are each associated with respective predetermined time durations. For example, the server 120 may be configured to generate, after expiration of the first predetermined time duration, a second challenge associated with a second predetermined time duration. In this manner, a new encrypted challenge associated with a predetermined time duration may be generated and transmitted so as to allow a limited time for decryption.

For example, the first challenge may be combined with a unique identifier of the card 105, a counter of the card 105, and one or more logical operations, including but not limited to, AND, OR, XOR, NOT. In some examples, the first challenge may be encrypted with one or more symmetric keys. For example, the card 105 may include its own symmetric key that is also known by the server 120, or may be derived via key diversification. In some examples, one or more unique derived keys may be generated based on combining one or more secret master keys with the unique identifier of the card 105. In both the card 105 and the server 120, the symmetric key may be independently derived from a master key, and thus the master key and the symmetric key may never be transmitted. In other examples, the first challenge may be encrypted by a private key of the card 105, in which a transmitted public key may be configured to decrypt the first challenge that was encrypted by the private key. In this manner, one or more additional challenges may be encrypted according to these various implementations.

Regarding the key diversification, and without limitation, the card 105 may include a card key, such as a diversified master key, and the server 120 may include its own server key, such as a master key. The card 105 may be configured to generate a diversified key using the diversified master key, one or more cryptographic algorithms, and a counter value. The card 105 may be configured to generate a cryptographic result including the counter value using the one or more cryptographic algorithms and the diversified key. The card 105 may be configured to encrypt transmission data using the one or more cryptographic algorithms and the diversified key to yield encrypted transmission data. The encrypted transmission data and cryptographic result may be transmitted, for example to server 120, by the card 105 for decryption.

The server 120 may be configured to generate an authentication diversified key based on the server master key and a unique identifier. The server 120 may be configured to generate a session key based on the authentication diversified key. The server 120 may be configured to decrypt encrypted transmission data and validate the received cryptographic result using the one or more cryptographic algorithms and the session key.

In some examples, the server 120 may be configured to generate the first challenge based on one or more factors. For example, the one or more factors may include a version number returned in the first read, and a determination of a predetermined type of transaction. For example, the first challenge may be generated based on the version number obtained in the first read. For example, the server 120 may be configured to determine if a transaction associated with the authentication request is a high-risk transaction. The server 120 may be configured to determine if the transaction is high-risk based on evaluation of one or more parameters, including one or more selected from the group of account data, transaction history data, transaction amount, previous time stamps associated with same or similar transactions, prior user authentication attempts and results, abnormal or suspicious geographic locations, abnormal or suspicious merchants, merchants with previous fraudulent activity, and/ or any combination thereof.

The application 116 of the client device 110 may be configured to transmit the encrypted first challenge as part of command-application protocol data unit (C-APDU) to the card 105. The one or more processors 102 of the card 105 may be configured to decrypt the encrypted first challenge received from the application 116 of the client device 110. In some examples, the first challenge may be unencrypted and transmitted by the application 116 of the client device 110, and received by the one or more processors 102 of the card 105. The one or more processors 102 of the card 105 may be configured to combine the first challenge with one or more private card keys in such a manner that either a secret key holder, such as the server 120 associated with an issuer of the card 105, may validate that it was combined correctly or via public key verification. When the first challenge is encrypted, the one or more processors 102 of the card 105 may be configured to transmit the decrypted first challenge to the application 116 of the client device 110 as part of a response-application protocol data unit (R-APDU). The response may be a second response and comprise a second cryptogram that incorporates the first challenge into the calculation, which may be combined with the one or more private card keys or as part of the message being signed. The one or more processors 102 of the card 105 may be configured to encrypt the second cryptogram prior to its transmission. The response may also include the random number, such as the secret salt, that is transmitted for verification by comparison with a reference random number or secret salt by the server 120. In some examples, the one or more processors 102 of the card 105 may be configured to perform one or more logical operations, such as an XOR, of the random number with the response prior to the encryption of the second cryptogram. The one or more processors 102 of the card 105 may be configured to transmit, after entry into one or more communication fields of any device, data, such as the second cryptogram. For example, the one or more processors 102 of the card 105 may be configured to transmit, after a second entry into a first communication field of the device, the second cryptogram to the application 116 of second device 110. Without limitation, each entry may be associated with a tap, a swipe, a wave, and/or any combination thereof.

The server 120 may be configured to receive the second response including the second cryptogram from the one or more processors 102 of the card 105. In some examples, the server 120 may be configured to receive the second response including the second cryptogram from the application 116 of the client device 110. The server 120 may be configured to authenticate the second response by validating the second cryptogram. For example, the server 120 may be configured to decrypt the second cryptogram. Based on a determination of an outcome of the decryption of the second cryptogram, the server 120 may be configured to transmit one or more results to the application 116 of the client device 110.

In some examples, the server 120 may be configured to transmit a successful authentication message if the second cryptogram is validated. For example, the server 120 may be configured to transmit the successful authentication message to the application 116 of the client device 110. In other examples, the server 120 may be configured to transmit an unsuccessful authentication message if the second cryptogram is not validated. For example, the server 120 may be configured to transmit the unsuccessful authentication message to the application 116 of the client device 110. If the second cryptogram is not validated, the server 120 may terminate the authentication process. In another example, the server 120 may be configured to resume the authentication process by, without limitation, resending the authentication request, or generating and encrypting and transmitting a different challenge.

Figure 2A:
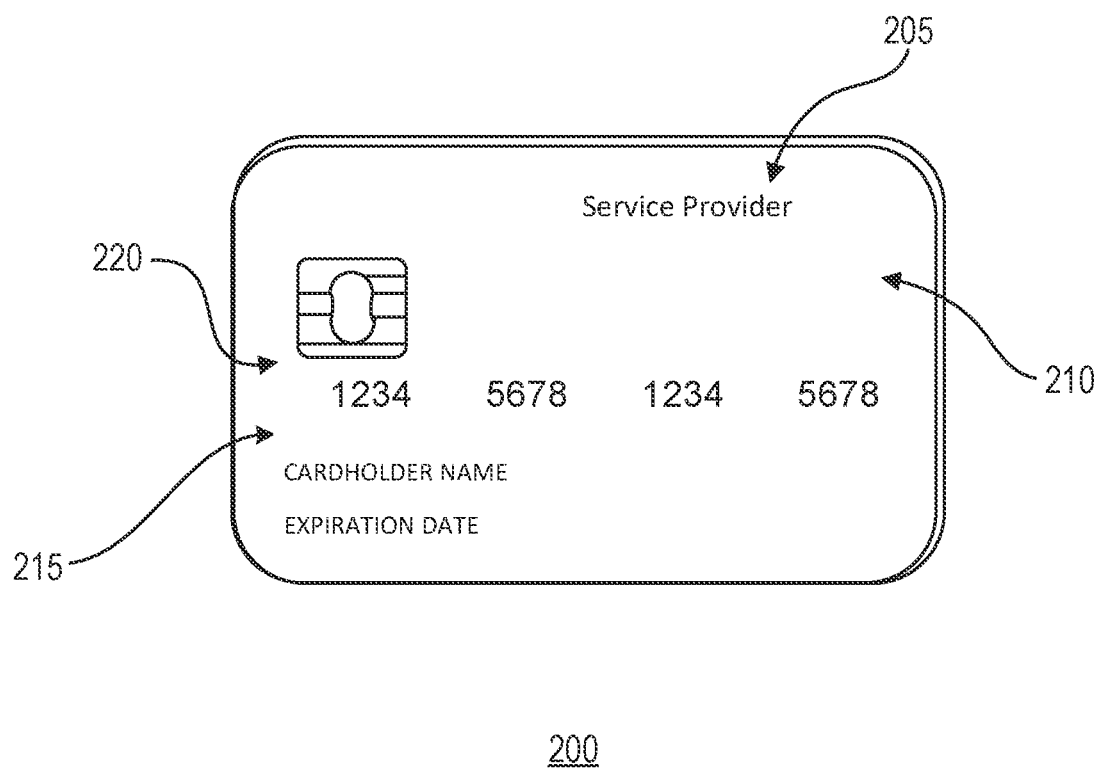
FIG. 2A is an illustration of a contactless card according to an exemplary embodiment.

FIG. 2A illustrates one or more first devices 200. First device 200 may reference the same or similar components of first device 105, as explained above with respect to FIG. 1. Although FIGS. 2A and 2B illustrate single instances of components of first device 200, any number of components may be utilized.

First device 200 may be configured to communicate with one or more components of system 100. First device 200 may comprise a contact-based card or contactless card, which may comprise a payment card, such as a credit card, debit card, or gift card, issued by a service provider 205 displayed on the front or back of the contactless card 200. In some examples, the contactless card 200 is not related to a payment card, and may comprise, without limitation, an identification card, a membership card, and a transportation card. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, including but not limited to a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

Figure 2B:
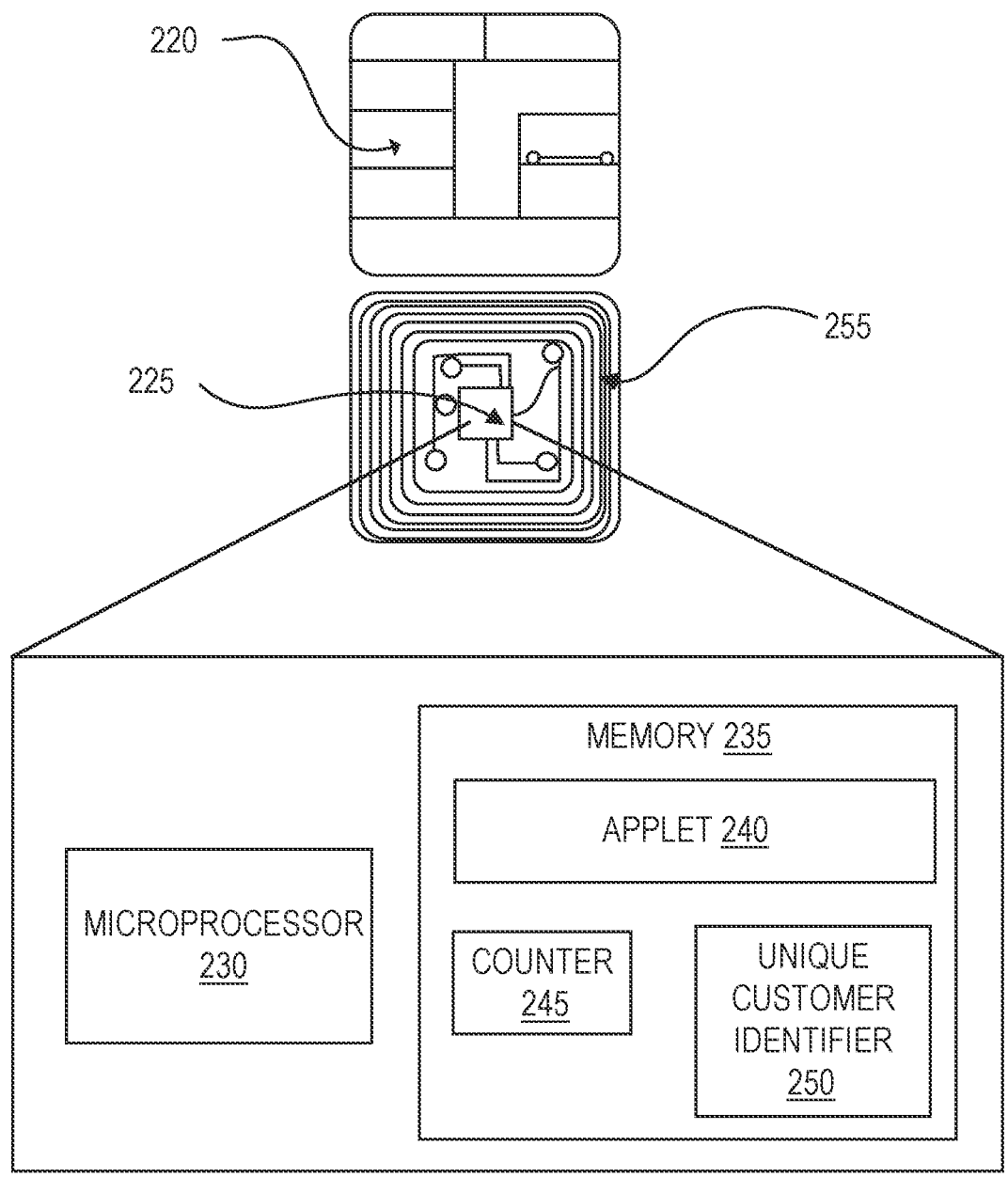
FIG. 2B is an illustration of a contact pad of a contactless card according to an exemplary embodiment.

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 220 or entirely separate from it, or as further elements in addition to processor 230 and memory 235 elements located within the contact pad 220.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

Figure 3:
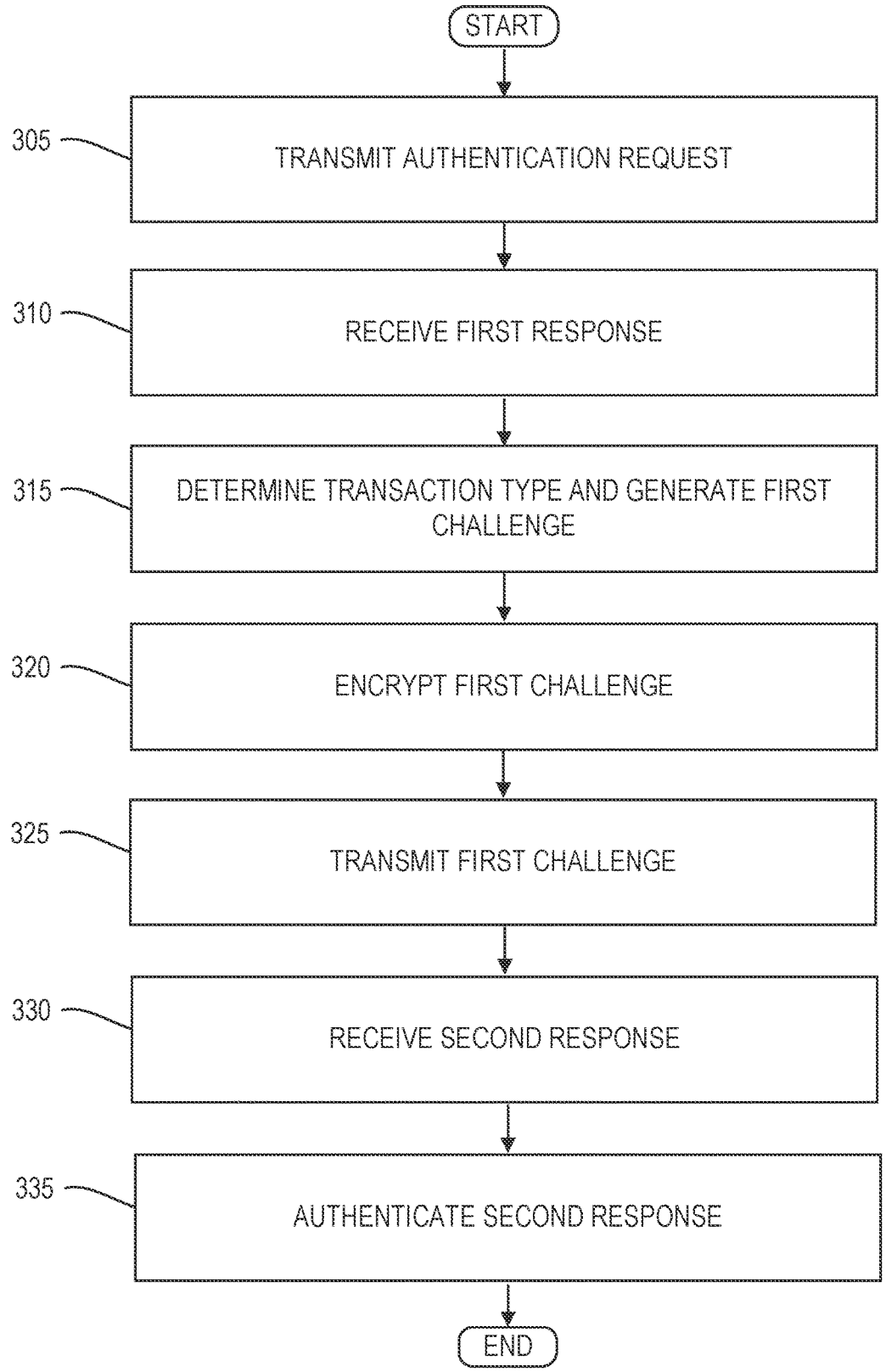
FIG. 3 depicts a method of authentication according to an exemplary embodiment.

FIG. 3 depicts a method 300 of authentication. FIG. 3 may reference the same or similar components of system 100, and first device 200 of FIG. 2A and FIG. 2B.

At block 305, the method 300 may include transmitting an authentication request. For example, the first request may comprise an authentication request. The application of the client device may be configured to receive the first request. The server may be configured to transmit the authentication request to the application of the client device. The application of the client device may be configured to conduct one or more reads of the card. For example, the application may be configured to conduct a read, such as a near field communication read, of a tag of the card.

At block 310, the method 300 may include receiving a first response that is responsive to the authentication request, the first response comprising a first cryptogram. For example, the card may be configured to transmit the first cryptogram as part of a first response. The card may be configured to transmit, after entry into one or more communication fields of any device, data responsive to the read, such as a first read. For example, the card may be configured to transmit, after a first entry into a first communication field of the device, the first cryptogram. Without limitation, each entry may be associated with a tap, a swipe, a wave, and/or any combination thereof. The first device or card may create the cryptogram using at least one key and a counter value. For example, one or more processors of the card may be configured to create a cryptogram using the at least one key and the counter value. The cryptogram may include the counter value and the transmission data. The card may include a memory containing one or more keys, including the at least one key, a counter value, and the transmission data. The card may further include a communication interface. The first cryptogram may be received, responsive to the authentication request, via a near field communication data exchange format (NDEF) read. The card may be configured to transmit the first cryptogram. The application of the client device may be configured to receive the first cryptogram and a public key from a response transmitted by the card. In some examples, the one or more processors of the card may be configured to generate and transmit, to the application of the client device, the first cryptogram using a shared secret. In some examples, the response may comprise a first response. The first response may be generated based on a first read of the tag of the card. The first response may also comprise a version number associated with the card. In some examples, the card may be configured to encrypt the first cryptogram prior to its transmission. For example, the first response may include any combination of a unique identifier of the card, a counter, a version number of the card that allows for changes in the one or more cryptographic algorithms used, and the first cryptogram that serves as a MAC. In some examples, the first response may comprise a public key digital signature. In other examples, the first response may comprise a MAC inside encrypt structure using one or more symmetric, or derived session, keys. For example, the card may be configured to generate a plurality of session keys, such as a first session key and a second session key, using secret keys combined with the counter of the card. The MAC may be generated with the first session key. The MAC may be encrypted with the second session key prior to its transmission for decryption and validation. In some examples, if a public key is also used for subsequent challenge validation, such as challenge validation by the server, the public key may be transmitted by the card in the clear or unencrypted, or alternatively the public key may be encrypted along with the MAC prior to transmission from the card. In addition, the message used in MAC construction may also include one or more shared secrets for further security. The server may be configured to generate unique derived keys using the unique identifier and master keys. The server may be configured to generate session keys from the unique derived keys and the counter. The server may be configured to decrypt the encrypted MAC from the first cryptogram. The server may be configured to validate the MAC using the session key.

In some examples, the server may be configured to receive the first cryptogram and the public key from a response transmitted by the card. The application of the client device may be configured to transmit the first cryptogram and the public key from the response by the card to the server. The server may be configured to decrypt the first cryptogram.

At block 315, the method 300 may include generating a first challenge based on the first response. For example, the server may be configured to, based on the first response, generate a first challenge. Moreover, the server may be configured to generate a random number, such as a secret salt, that is associated with a transaction and also included with the transmitted first challenge. The random number may be generated by the server and may be unique for each transaction. For example, the random number may comprise a string of bits with high entropy. In some examples, the random number may serve as an additional component in the MAC calculation, and include any length. In other examples, the random number may be the same length as the message for combining, such as the one or more logical operations including but not limited to, AND, OR, XOR, NOT.

In some examples, the server may be configured to generate the first challenge based on one or more factors. For example, the one or more factors may include a version number returned in the first read, and a determination of a predetermined type of transaction. For example, the first challenge may be generated based on the version number obtained in the first read. For example, the server may be configured to determine if a transaction associated with the authentication request is a high-risk transaction. The server may be configured to determine if the transaction is high-risk based on evaluation of one or more parameters, including one or more selected from the group of account data, transaction history data, transaction amount, previous time stamps associated with same or similar transactions, prior user authentication attempts and results, abnormal or suspicious geographic locations, abnormal or suspicious fraudulent merchants, and/or any combination thereof.

The first challenge may be associated with a first predetermined time duration. Thus, the first challenge may be time-limited. For example, the server may be configured to generate, after expiration of the first predetermined time duration, one or more additional challenges that are each associated with respective predetermined time durations. For example, the server may be configured to generate, after expiration of the first predetermined time duration, a second challenge associated with a second predetermined time duration. In this manner, a new encrypted challenge associated with a predetermined time duration may be generated and transmitted so as to allow a limited time for decryption.

At block 320, the method 300 may include encrypting the first challenge with a symmetric key. The server may be configured to encrypt the first challenge with a key, such as a symmetric key. In other examples, the application of the device may be configured to encrypt the first challenge with the key. For example, the first challenge may be combined with a unique identifier of the card, a counter of the card, and one or more logical operations, including but not limited to, AND, OR, XOR, NOT. In some examples, the first challenge may be encrypted with one or more symmetric keys. For example, the card may include its own symmetric key that is also known by the server, or may be derived via key diversification. In some examples, one or more unique derived keys may be generated based on combining one or more secret master keys with the unique identifier of the card. In both the card and the server, the symmetric key may be independently derived from a master key, and thus the master key and the symmetric key may never be transmitted. In other examples, the first challenge may be encrypted by a private key of the card, in which a transmitted public key may be configured to decrypt the first challenge that was encrypted by the private key.

Regarding the key diversification, and without limitation, the card may include a card key, such as a diversified master key, and the server may include its own server key, such as a master key. The card may be configured to generate a diversified key using the diversified master key, one or more cryptographic algorithms, and a counter value. The card may be configured to generate a cryptographic result including the counter value using the one or more cryptographic algorithms and the diversified key. The card may be configured to encrypt transmission data using the one or more cryptographic algorithms and the diversified key to yield encrypted transmission data. The encrypted transmission data and cryptographic result may be transmitted, for example to server, by the card for decryption.

The server may be configured to generate an authentication diversified key based on the server master key and a unique identifier. The server may be configured to generate a session key based on the authentication diversified key. The server may be configured to decrypt encrypted transmission data and validate the received cryptographic result using the one or more cryptographic algorithms and the session key.

At block 325, the method 300 may include transmitting the first challenge. For example, the server may be configured to transmit the encrypted first challenge to the application of the client device. In some examples, the server may be configured to transmit the encrypted first challenge based on the version number received from the card or the application of the device. In some examples, the application of the client device may be configured to transmit the encrypted first challenge as part of command-application protocol data unit (C-APDU) to the card.

At block 330, the method 300 may include receiving a second response that is responsive to the first challenge, the second response comprising a second cryptogram. For example, the server may be configured to receive the second response including the second cryptogram from the card. In some examples, the server may be configured to receive the second response including the second cryptogram from the application of the client device. The card may be configured to decrypt the encrypted first challenge received from the application of the client device. In some examples, the first challenge may be unencrypted and transmitted by the application of the client device, and received by the one or more processors of the card. The one or more processors of the card may be configured to combine the first challenge with one or more private card keys in such a manner that either a secret key holder, such as the server associated with an issuer of the card, may validate that it was combined correctly or via public key verification. When the first challenge is encrypted, the card may be configured to transmit the decrypted first challenge to the application of the client device as part of a response-application protocol data unit (R-APDU). The response may be a second response and comprise a second cryptogram that incorporates the first challenge into the calculation, which may be combined with the one or more private card keys or as part of the message being signed. The card may be configured to encrypt the second cryptogram prior to its transmission. The response may also include the random number, such as the secret salt, that is transmitted for verification by comparison with a reference random number or secret salt by the server. In some examples, the card may be configured to perform one or more logical operations, e.g., AND, OR, XOR, NOT, of the random number with the response prior to the cryptogram encryption. The card may be configured to transmit, after entry into one or more communication fields of any device, data, such as the second cryptogram. For example, the card may be configured to transmit, after a second entry into a first communication field of the device, the second cryptogram. Without limitation, each entry may be associated with a tap, a swipe, a wave, and/or any combination thereof.

At block 335, the method 300 may include authenticating the second response. For example, the server may be configured to authenticate the second response by validating the second cryptogram. For example, the server may be configured to decrypt the second cryptogram. Based on a determination of an outcome of the decryption of the second cryptogram, the server may be configured to transmit one or more results to the application of the client device.

Figure 4:
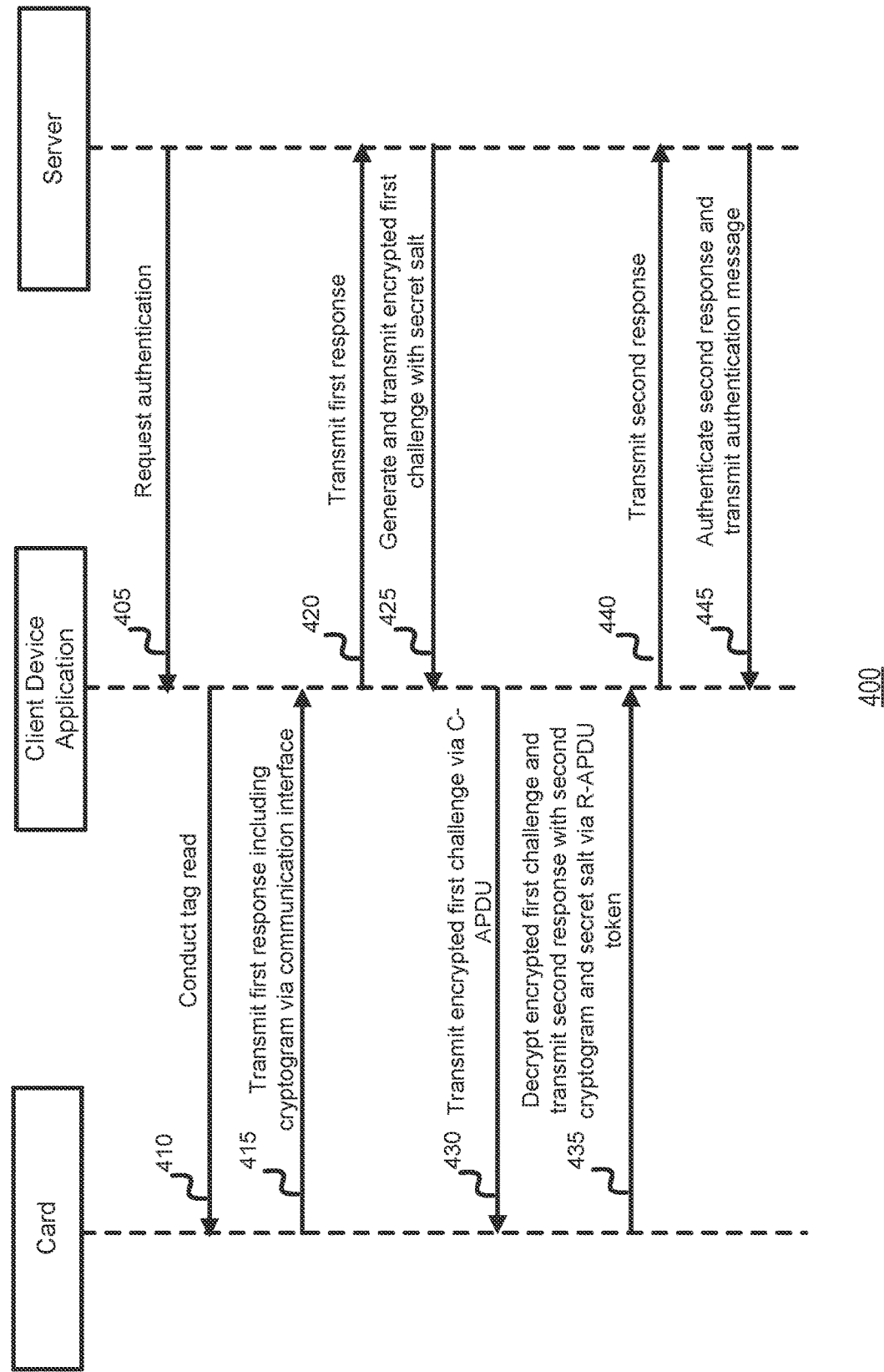
FIG. 4 depicts a sequence diagram of a process for authentication according to an exemplary embodiment.

FIG. 4 depicts a sequence diagram 400 of a process for authentication according to an exemplary embodiment. FIG. 4 may reference the same or similar components of system 100, first device 200 of FIG. 2A and FIG. 2B, and method 300 of FIG. 3.

At step 405, a server may be configured to transmit a first request. For example, the first request may comprise an authentication request. An application of a client device may be configured to receive the first request. At step 410, the application of the client device may be configured to conduct one or more reads of a card as part of the first request. For example, the application may be configured to conduct a read, such as a near field communication read, of a tag of the card.

At step 415, the card may be configured to transmit the first cryptogram. The card may be configured to transmit, after entry into one or more communication fields of any device, data responsive to the read, such as a first read, via a communication interface. For example, the card may be configured to transmit, after a first entry into a first communication field of the device, the first cryptogram. Without limitation, each entry may be associated with a tap, a swipe, a wave, and/or any combination thereof. The application of the client device may be configured to receive the first cryptogram and a public key from a response transmitted by the card. In some examples, the one or more processors of the card may be configured to generate and transmit, to the application of the client device, the first cryptogram using a shared secret. In some examples, the response may comprise a first response. The first response may be generated based on a first read of the tag of the card. The first response may also comprise a version number associated with the card. In some examples, the card may be configured to encrypt the first cryptogram prior to its transmission. For example, the first response may include any combination of a unique identifier of the card, a counter, a version number of the card that allows for changes in the one or more cryptographic algorithms used, and the first cryptogram that serves as a MAC. In some examples, the first response may comprise a public key digital signature. In other examples, the first response may comprise a MAC inside encrypt structure using one or more symmetric, or derived session, keys. For example, the card may be configured to generate a plurality of session keys, such as a first session key and a second session key, using secret keys combined with the counter of the card. The MAC may be generated with the first session key. The MAC may be encrypted with the second session key prior to its transmission for decryption and validation. In some examples, if a public key is also used for subsequent challenge validation, such as challenge validation by the server, the public key may be transmitted by the card in the clear or unencrypted, or alternatively the public key may be encrypted along with the MAC prior to transmission from the card. In addition, the message used in MAC construction may also include one or more shared secrets for further security. The server may be configured to generate unique derived keys using the unique identifier and master keys. The server may be configured to generate session keys from the unique derived keys and the counter. The server may be configured to decrypt the encrypted MAC from the first cryptogram. The server may be configured to validate the MAC using the session key.

At step 420, the application of the client device may be configured to transmit the first cryptogram and the public key from the response by the card to the server. In some examples, the server may be configured to receive the first cryptogram and the public key from a response transmitted by the card. The server may be configured to decrypt the first cryptogram.

The server may be configured to, based on the first response, generate a first challenge. The server may be configured to encrypt the first challenge with a key, such as a symmetric key. Moreover, the server may be configured to generate a random number, such as a secret salt, that is associated with a transaction and also included with the transmitted first challenge. The random number may be generated by the server and may be unique for each transaction. For example, the first challenge may be combined with a unique identifier of the card, a counter of the card, and one or more logical operations, including but not limited to, AND, OR, XOR, NOT. In some examples, the first challenge may be encrypted with one or more symmetric keys. For example, the card may include its own symmetric key that is also known by the server, or may be derived via key diversification. In some examples, one or more unique derived keys may be generated based on combining one or more secret master keys with the unique identifier of the card. In both the card and the server, the symmetric key may be independently derived from a master key, and thus the master key and the symmetric key may never be transmitted. In other examples, the first challenge may be encrypted by a private key of the card, in which a transmitted public key may be configured to decrypt the first challenge that was encrypted by the private key.

Regarding the key diversification, and without limitation, the card may include a card key, such as a diversified master key, and the server may include its own server key, such as a master key. The card may be configured to generate a diversified key using the diversified master key, one or more cryptographic algorithms, and a counter value. The card may be configured to generate a cryptographic result including the counter value using the one or more cryptographic algorithms and the diversified key. The card may be configured to encrypt transmission data using the one or more cryptographic algorithms and the diversified key to yield encrypted transmission data. The encrypted transmission data and cryptographic result may be transmitted, for example to server, by the card for decryption.

The server may be configured to generate an authentication diversified key based on the server master key and a unique identifier. The server may be configured to generate a session key based on the authentication diversified key. The server may be configured to decrypt encrypted transmission data and validate the received cryptographic result using the one or more cryptographic algorithms and the session key.

The first challenge may be associated with a first predetermined time duration. Thus, the first challenge may be time-limited. For example, the server may be configured to generate, after expiration of the first predetermined time duration, one or more additional challenges that are each associated with respective predetermined time durations. For example, the server may be configured to generate, after expiration of the first predetermined time duration, a second challenge associated with a second predetermined time duration. In this manner, a new encrypted challenge associated with a predetermined time duration may be generated and transmitted so as to allow a limited time for decryption.

In some examples, the server may be configured to generate the first challenge based on one or more factors. For example, the one or more factors may include a version number returned in the first read, and a determination of a predetermined type of transaction. For example, the first challenge may be generated based on the version number obtained in the first read. For example, the server may be configured to determine if a transaction associated with the authentication request is a high-risk transaction. The server may be configured to determine if the transaction is high-risk based on evaluation of one or more parameters, including one or more selected from the group of account data, transaction history data, transaction amount, previous time stamps associated with same or similar transactions, prior user authentication attempts and results, abnormal or suspicious geographic locations, abnormal or suspicious fraudulent merchants, and/or any combination thereof.

At step 425, the server may be configured to transmit the encrypted first challenge to the application of the client device. In some examples, the server may be configured to transmit the encrypted first challenge based on the version number received from the card or the application of the device. The application of the client device may be configured to receive the encrypted first challenge from the server.

At step 430, the application of the client device may be configured to transmit the encrypted first challenge as part of command-application protocol data unit (C-APDU) to the card.

At step 435, the card may be configured to decrypt the encrypted first challenge received from the application of the client device. In some examples, the first challenge may be unencrypted and transmitted by the application of the client device, and received by the one or more processors of the card. The one or more processors of the card may be configured to combine the first challenge with one or more private card keys in such a manner that either a secret key holder, such as the server associated with an issuer of the card, may validate that it was combined correctly or via public key verification. When the first challenge is encrypted, the card may be configured to transmit the decrypted first challenge to the application of the client device as part of a response-application protocol data unit (R-APDU). The response may be a second response and comprise a second cryptogram that incorporates the first challenge into the calculation, which may be combined with the one or more private card keys or as part of the message being signed. The card may be configured to encrypt the second cryptogram prior to its transmission. The response may also include the random number, such as the secret salt, that is transmitted for verification by comparison with a reference random number or secret salt by the server. In some examples, the card may be configured to perform one or more logical operations, e.g., AND, OR, XOR, NOT, of the random number with the response prior to the encryption of the second cryptogram. The card may be configured to transmit, after entry into one or more communication fields of any device, data, such as the second cryptogram. For example, the card may be configured to transmit, after a second entry into a first communication field of the device, the second cryptogram. Without limitation, each entry may be associated with a tap, a swipe, a wave, and/or any combination thereof.

At step 440, the server may be configured to receive the second response including the second cryptogram. In some examples, the server may be configured to receive the second response including the second cryptogram from the application of the client device. The server may be configured to authenticate the second response by validating the second cryptogram. For example, the server may be configured to decrypt the second cryptogram. Based on a determination of an outcome of the decryption of the second cryptogram, the server may be configured to transmit one or more results to the application of the client device.

At step 445, the server may be configured to transmit a successful authentication message if the second cryptogram is validated. For example, the server may be configured to transmit the successful authentication message to the application of the client device. In other examples, the server may be configured to transmit an unsuccessful authentication message if the second cryptogram is not validated. For example, the server may be configured to transmit the unsuccessful authentication message to the application of the client device. If the second cryptogram is not validated, the server may terminate the authentication process. In another example, the server may be configured to resume the authentication process by, without limitation, resending the authentication request, or generating and encrypting and transmitting a different challenge.

Figure 5:
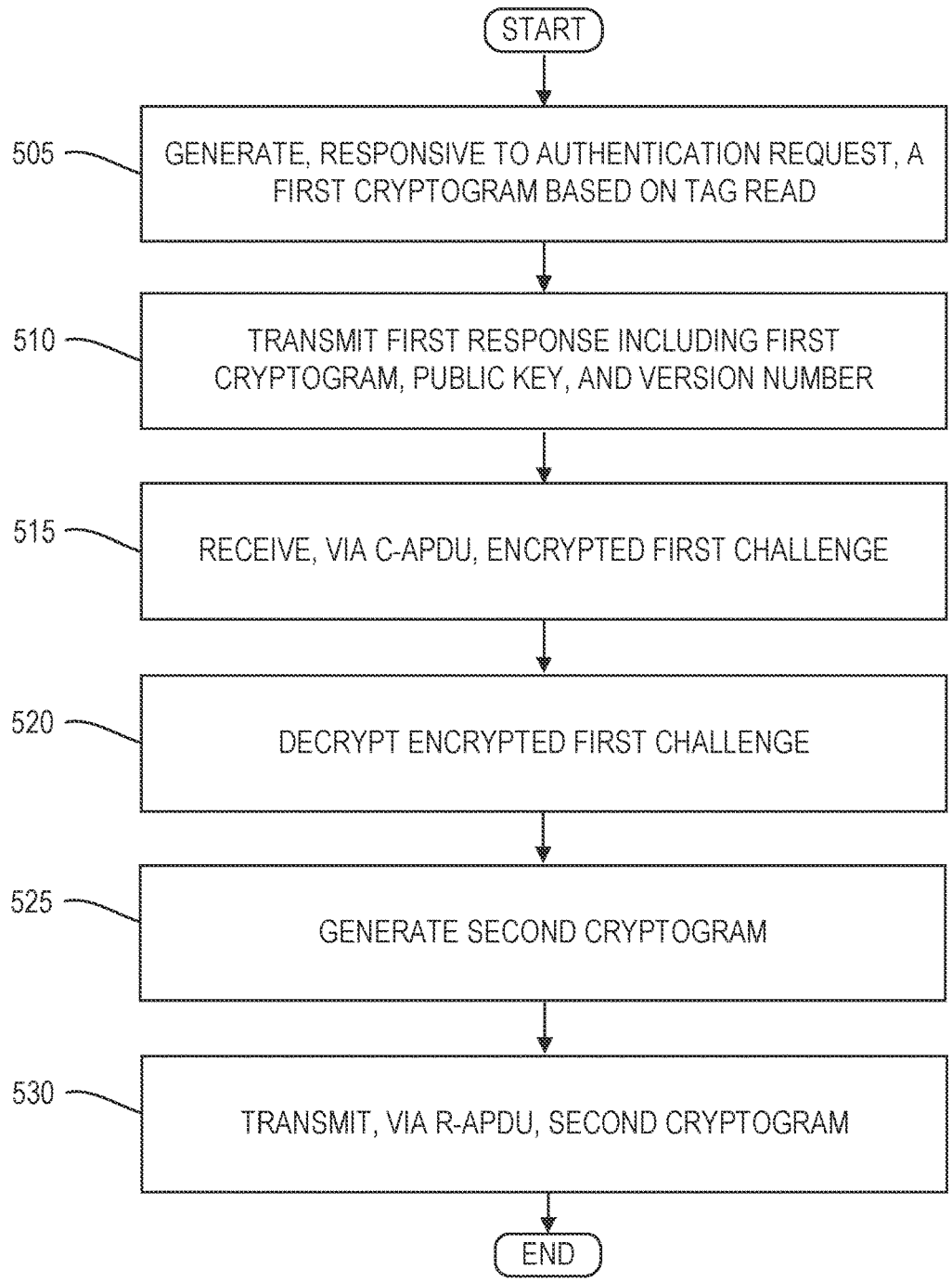
FIG. 5 depicts a method of authentication according to an exemplary embodiment.

FIG. 5 depicts a method of 500 of authentication according to an exemplary embodiment. FIG. 5 may reference the same or similar components of system 100, first device 200 of FIG. 2A and FIG. 2B, method 300 of FIG. 3, and sequence diagram 400 of FIG. 4.

At block 505, the method 500 may include generating, in response to an authentication request, a first cryptogram based on a read of a tag. For example, an application of the client device may be configured to conduct one or more reads of the card. For example, the application may be configured to conduct a read, such as a near field communication read, of a tag of the card.

At block 510, the method 500 may include transmitting a first response including the first cryptogram and a public key and a version number. The first cryptogram may be received, upon request, via a near field communication data exchange format (NDEF) read. The card may be configured to transmit the first cryptogram. The card may be configured to transmit, after entry into one or more communication fields of any device, data responsive to the read, such as a first read. For example, the card may be configured to transmit, after a first entry into a first communication field of the device, the first cryptogram. In some examples, the one or more processors of the card may be configured to generate and transmit, to the application of the client device, the first cryptogram using a shared secret. Without limitation, each entry may be associated with a tap, a swipe, a wave, and/or any combination thereof. The first response may be generated based on a first read of the tag of the card. The first response may also comprise a version number associated with the card. In some examples, the card may be configured to encrypt the first cryptogram prior to its transmission. For example, the first response may include any combination of a unique identifier of the card, a counter, a version number of the card that allows for changes in the one or more cryptographic algorithms used, and the first cryptogram that serves as a MAC. In some examples, the first response may comprise a public key digital signature. In other examples, the first response may comprise a MAC inside encrypt structure using one or more symmetric, or derived session, keys. For example, the card may be configured to generate a plurality of session keys, such as a first session key and a second session key, using secret keys combined with the counter of the card. The MAC may be generated with the first session key. The MAC may be encrypted with the second session key prior to its transmission for decryption and validation. In some examples, if a public key is also used for subsequent challenge validation, such as challenge validation by the server, the public key may be transmitted by the card in the clear or unencrypted, or alternatively the public key may be encrypted along with the MAC prior to transmission from the card. In addition, the message used in MAC construction may also include one or more shared secrets for further security. The server may be configured to generate unique derived keys using the unique identifier and master keys. The server may be configured to generate session keys from the unique derived keys and the counter. The server may be configured to decrypt the encrypted MAC from the first cryptogram. The server may be configured to validate the MAC using the session key.

At block 515, the method 500 may include receiving, via a command-application protocol data unit (C-APDU), an encrypted first challenge. For example, a server may be configured to, based on the received and authenticated first response, generate a first challenge. The server may be configured to decrypt the first cryptogram transmitted by the card. The server may be configured to encrypt the first challenge with a key, such as a symmetric key. For example, the first challenge may be combined with a unique identifier of the card, a counter of the card, and one or more logical operations, including but not limited to, AND, OR, XOR, NOT. In some examples, the first challenge may be encrypted with one or more symmetric keys. For example, the card may include its own symmetric key that is also known by the server, or may be derived via key diversification. In some examples, one or more unique derived keys may be generated based on combining one or more secret master keys with the unique identifier of the card. In both the card and the server, the symmetric key may be independently derived from a master key, and thus the master key and the symmetric key may never be transmitted. In other examples, the first challenge may be encrypted by a private key of the card, in which a transmitted public key may be configured to decrypt the first challenge that was encrypted by the private key.

Regarding the key diversification, and without limitation, the card may include a card key, such as a diversified master key, and the server may include its own server key, such as a master key. The card may be configured to generate a diversified key using the diversified master key, one or more cryptographic algorithms, and a counter value. The card may be configured to generate a cryptographic result including the counter value using the one or more cryptographic algorithms and the diversified key. The card may be configured to encrypt transmission data using the one or more cryptographic algorithms and the diversified key to yield encrypted transmission data. The encrypted transmission data and cryptographic result may be transmitted, for example to server, by the card for decryption.

The server may be configured to generate an authentication diversified key based on the server master key and a unique identifier. The server may be configured to generate a session key based on the authentication diversified key. The server may be configured to decrypt encrypted transmission data and validate the received cryptographic result using the one or more cryptographic algorithms and the session key.

The server may be configured to transmit the encrypted first challenge to the application of the client device. In some examples, the server may be configured to transmit the encrypted first challenge based on the version number received from the card or the application of the device. Moreover, the server may be configured to generate a random number, such as a secret salt, that is associated with a transaction and also included with the transmitted first challenge. The random number may be generated by the server and may be unique for each transaction. For example, the random number may comprise a string of bits with high entropy. In some examples, the random number may serve as an additional component in the MAC calculation, and include any length. In other examples, the random number may be the same length as the message for combining, such as the one or more logical operations including but not limited to, AND, OR, XOR, NOT.

The first challenge may be associated with a first predetermined time duration. Thus, the first challenge may be time-limited. For example, the server may be configured to generate, after expiration of the first predetermined time duration, one or more additional challenges that are each associated with respective predetermined time durations. For example, the server may be configured to generate, after expiration of the first predetermined time duration, a second challenge associated with a second predetermined time duration. In this manner, a new encrypted challenge associated with a predetermined time duration may be generated and transmitted so as to allow a limited time for decryption.

In some examples, the server may be configured to generate the first challenge based on one or more factors. For example, the one or more factors may include a version number returned in the first read, and a determination of a predetermined type of transaction. For example, the first challenge may be generated based on the version number obtained in the first read. For example, the server may be configured to determine if a transaction associated with the authentication request is a high-risk transaction. The server may be configured to determine if the transaction is high-risk based on evaluation of one or more parameters, including one or more selected from the group of account data, transaction history data, transaction amount, previous time stamps associated with same or similar transactions, prior user authentication attempts and results, abnormal or suspicious geographic locations, abnormal or suspicious fraudulent merchants, and/or any combination thereof.

At block 520, the method 500 may include decrypting the encrypted first challenge. For example, the card may be configured to decrypt the encrypted first challenge received from the application of the client device. In some examples, the first challenge may be unencrypted and transmitted by the application of the client device, and received by the one or more processors of the card. The one or more processors of the card may be configured to combine the first challenge with one or more private card keys in such a manner that either a secret key holder, such as the server associated with an issuer of the card, may validate that it was combined correctly or via public key verification.

At block 525, the method 500 may include generating a second cryptogram. The response may be a second response and comprise a second cryptogram that incorporates the first challenge into the calculation, which may be combined with the one or more private card keys or as part of the message being signed. The card may be configured to encrypt the second cryptogram prior to its transmission. In some examples, the card may be configured to perform one or more logical operations, e.g., AND, OR, XOR, NOT, of the random number with the response prior to the encryption of the second cryptogram.

At block 530, the method 500 may include transmitting, responsive to the command-application protocol data unit, a second response including the second cryptogram. The card may be configured to transmit the decrypted first challenge to the application of the client device as part of a response-application protocol data unit (R-APDU). The response may also include the random number, such as the secret salt, that is transmitted for verification by comparison with a reference random number or secret salt by the server. The card may be configured to transmit, after entry into one or more communication fields of any device, data, such as the second cryptogram. For example, the card may be configured to transmit, after a second entry into a first communication field of the device, the second response including second cryptogram and random number. Without limitation, each entry may be associated with a tap, a swipe, a wave, and/or any combination thereof.

Figure 6:
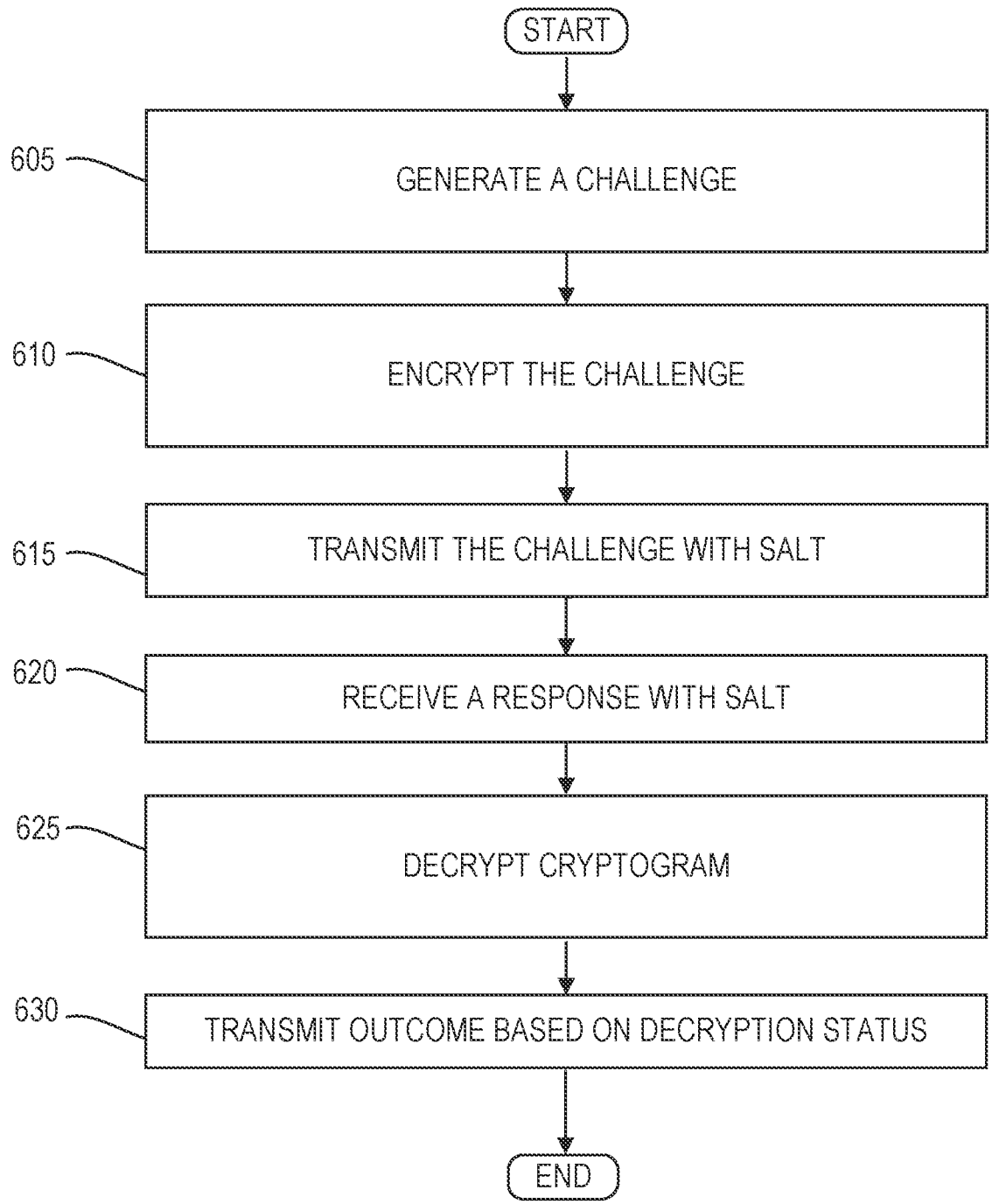
FIG. 6 depicts a method of authentication according to an exemplary embodiment.

FIG. 6 depicts a method 600 of authentication according to an exemplary embodiment. FIG. 6 may reference the same or similar components of system 100, first device 200 of FIG. 2A and FIG. 2B, method 300 of FIG. 3, sequence diagram 400 of FIG. 4, and method 500 of FIG. 5.

At block 605, the method 600 may include generating a challenge. For example, the server may be configured to generate the challenge. In some examples, the application of the device may be configured to generate the challenge. Moreover, the server or application of the device may be configured to generate a random number, such as a secret salt, that is associated with a transaction and also included with the transmitted challenge. The random number may be generated by the server or the application of the device and may be unique for each transaction. For example, the random number may comprise a string of bits with high entropy. In some examples, the random number may serve as an additional component in the MAC calculation, and include any length. In other examples, the random number may be the same length as the message for combining, such as the one or more logical operations including but not limited to, AND, OR, XOR, NOT.

In some examples, the server may be configured to generate the challenge based on one or more factors. For example, the one or more factors may include a version number associated with a card and returned in a read, and a determination of a predetermined type of transaction. For example, the challenge may be generated based on the version number obtained in the read. The server may be configured to determine if a transaction associated with the authentication request is a high-risk transaction. The server may be configured to determine if the transaction is high-risk based on evaluation of one or more parameters, including one or more selected from the group of account data, transaction history data, transaction amount, previous time stamps associated with same or similar transactions, prior user authentication attempts and results, abnormal or suspicious geographic locations, abnormal or suspicious fraudulent merchants, and/or any combination thereof.

The challenge may be associated with a predetermined time duration. Thus, the challenge may be time-limited. For example, the server may be configured to generate, after expiration of the predetermined time duration, one or more additional challenges that are each associated with respective predetermined time durations. For example, the server may be configured to generate, after expiration of the predetermined time duration, a second challenge associated with a second predetermined time duration. In this manner, a new encrypted challenge associated with a predetermined time duration may be generated and transmitted so as to allow a limited time for decryption.

At block 610, the method 600 may include encrypting the challenge. For example, the server may be configured to encrypt the challenge with a key, such as a symmetric key. In other examples, the application of the device may be configured to encrypt the challenge with the key. For example, the challenge may be combined with a unique identifier of the card, a counter of the card, and one or more logical operations, including but not limited to, AND, OR, XOR, NOT. In some examples, the challenge may be encrypted with one or more symmetric keys. For example, the card may include its own symmetric key that is also known by the server or the application comprising instructions for execution on the device, or may be derived via key diversification. In some examples, one or more unique derived keys may be generated based on combining one or more secret master keys with the unique identifier of the card. In the card and the server or the application, symmetric key be independently derived from a master key, and is thus never transmitted. In other examples, the first challenge may be encrypted by a private key of the card, in which a transmitted public key may be configured to decrypt the first challenge that was encrypted by the private key.

Regarding the key diversification, and without limitation, the card may include a card key, such as a diversified master key, and the server may include its own server key, such as a master key. The card may be configured to generate a diversified key using the diversified master key, one or more cryptographic algorithms, and a counter value. The card may be configured to generate a cryptographic result including the counter value using the one or more cryptographic algorithms and the diversified key. The card may be configured to encrypt transmission data using the one or more cryptographic algorithms and the diversified key to yield encrypted transmission data. The encrypted transmission data and cryptographic result may be transmitted, for example to server, by the card for decryption.

The server may be configured to generate an authentication diversified key based on the server master key and a unique identifier. The server may be configured to generate a session key based on the authentication diversified key. The server may be configured to decrypt encrypted transmission data and validate the received cryptographic result using the one or more cryptographic algorithms and the session key.

At block 615, the method 600 may include transmitting the challenge. For example, the server may be configured to transmit the encrypted challenge to the application of the client device. In some examples, the server may be configured to transmit the encrypted challenge based on the version number received from the card or the application of the device. In other examples, the application of the device may be configured to transmit the challenge. For example, the application of the client device may be configured to transmit the encrypted challenge as part of command-application protocol data unit (C-APDU) to the card.

At block 620, the method 600 may include receiving a response. For example, the server may be configured to receive a response. In other examples, the application of the device may be configured to receive the response. The response may be transmitted responsive to the transmitted challenge. The server may be configured to receive the response including a cryptogram from the card. In some examples, the server may be configured to receive the response including the cryptogram from the application of the client device.

The card may be configured to decrypt the encrypted challenge received from the application of the client device. In some examples, the first challenge may be unencrypted and transmitted by the application of the client device, and received by the one or more processors of the card. The one or more processors of the card may be configured to combine the first challenge with one or more private card keys in such a manner that either a secret key holder, such as the server associated with an issuer of the card, may validate that it was combined correctly or via public key verification. When the first challenge is encrypted, the card may be configured to transmit the decrypted challenge to the application of the client device as part of a response-application protocol data unit (R-APDU). The response may be a response and comprise a cryptogram. The card may be configured to encrypt the cryptogram prior to its transmission. The response may also include the random number, such as the secret salt, that is transmitted for verification by comparison with a reference random number or secret salt by the server. In some examples, the card may be configured to perform one or more logical operations, e.g., AND, OR, XOR, NOT, of the random number with the response prior to the cryptogram encryption. The card may be configured to transmit, after entry into one or more communication fields of any device, data, such as the cryptogram. For example, the card may be configured to transmit, after an entry into a communication field of the device, the cryptogram. Without limitation, each entry may be associated with a tap, a swipe, a wave, and/or any combination thereof.

At block 625, the method 600 may include decrypting the cryptogram. For example, the server may be configured to decrypt the received cryptogram from the response. In other examples, the application of the device may be configured to decrypt the received cryptogram from the response. The server may be configured to authenticate the response by validating the cryptogram. For example, the server may be configured to decrypt the cryptogram.

At block 630, the method 600 may include transmitting an outcome based on a status of decryption of the cryptogram. For example, based on a determination of an outcome of the decryption of the cryptogram, the server may be configured to transmit one or more results to the application of the client device. The one or more results may be indicative of the decryption status. In some examples, the server may be configured to transmit a successful authentication message if the cryptogram is validated. For example, the server may be configured to transmit the successful authentication message to the application of the client device. In other examples, the server may be configured to transmit an unsuccessful authentication message if the cryptogram is not validated. For example, the server may be configured to transmit the unsuccessful authentication message to the application of the client device. If the cryptogram is not validated, the server may terminate the authentication process. In another example, the server may be configured to resume the authentication process by, without limitation, resending the authentication request, or generating and encrypting and transmitting a different challenge.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims. The specification and drawings are accordingly to be regarded as an illustrative rather than restrictive sense.

We claim:

1. An authentication server, comprising:
a processor; and
a memory,
wherein the processor:
   transmits an authentication request;
   receives a first response that is responsive to the authentication request, the first response comprising a first cryptogram;
   generates a first challenge based on the first response;
   encrypts the first challenge with a symmetric key;
   generates a secret salt that is associated with a transaction;
   transmits the first challenge after it has been encrypted and transmits the secret salt along with the encrypted first challenge;
   receives a second response that is responsive to the first challenge, the second response comprising a second cryptogram, wherein the second cryptogram is generated using the first challenge in combination with one or more private card keys, and comprises the secret salt;
   authenticates the second response by:
      decrypting the second cryptogram, and
      validating the decrypted second cryptogram using a session key by comparing the secret salt from the second cryptogram with a reference secret salt; and
   transmits, to a client device, one or more authentication messages as a result of the validation of the decrypted second cryptogram.

2. The authentication server of claim 1, wherein the first response is generated based on a first read of a tag.

3. The authentication server of claim 2, wherein the first read of the tag includes a read of a tag of a contactless card and the first response includes a version number associated with the contactless card.

4. The authentication server of claim 1, wherein the first challenge is associated with a first predetermined time duration.

5. The authentication server of claim 4, wherein the processor generates, after expiration of the first predetermined time duration, a second challenge associated with a second predetermined time duration.

6. The authentication server of claim 1, wherein the processor generates the first challenge based on a determination of a predetermined type of transaction.

7. The authentication server of claim 1, wherein the processor receives a public key and a version number.

8. The authentication server of claim 7, wherein the first challenge is transmitted based on the version number.

9. A method of authentication, the method comprising the steps of:
   transmitting an authentication request;
   receiving a first response that is responsive to the authentication request, the first response comprising a first cryptogram;
   generating a first challenge based on the first response;
   encrypting the first challenge with a symmetric key;
   generating a secret salt that is associated with a transaction;
   transmitting the first challenge after it has been encrypted and transmitting the secret salt along with the encrypted first challenge;
   receiving a second response that is responsive to the first challenge, the second response comprising a second cryptogram, wherein the second cryptogram is generated using the first challenge in combination with one or more private card keys, and comprises the secret salt;
   authenticating the second response by:
      decrypting the second cryptogram, and
      validating the decrypted second cryptogram using a session key by comparing the secret salt from the second cryptogram with a reference secret salt; and
   transmitting, to a client device, one or more authentication messages as a result of the validation of the decrypted second cryptogram.

10. The method of claim 9, wherein the first response is generated based on a first read of a tag.

11. The method of claim 10, wherein the first read of the tag includes a read of a tag of a contactless card and the first response includes a version number associated with the contactless card.

12. The method of claim 9, wherein the first challenge is associated with a first predetermined time duration.

13. The method of claim 12, further comprising generating, after expiration of the first predetermined time duration, a second challenge associated with a second predetermined time duration.

14. The method of claim 9, further comprising generating the first challenge based on a determination of a predetermined type of transaction.

15. The method of claim 9, further comprising receiving a public key and a version number.

16. The method of claim 15, wherein the first challenge is transmitted based on the version number.

17. The method of claim 9, further comprising decrypting the second response including the secret salt.

18. The method of claim 9, further comprising transmitting, based on determining an outcome of decryption status of the second cryptogram, one or more messages indicative of the decryption status.

19. The method of claim 9, wherein the first cryptogram is received via a near field communication data exchange format (NDEF) read.

20. A computer readable non-transitory medium comprising computer executable instructions that, when executed on a processor, perform procedures comprising the steps of:
   transmitting an authentication request;
   receiving a first response that is responsive to the authentication request, the first response comprising a first cryptogram;
   generating a first challenge based on the first response;
   encrypting the first challenge with a symmetric key;
   generating a secret salt that is associated with a transaction;
   transmitting the first challenge after it has been encrypted and transmitting the secret salt along with the encrypted first challenge;
   receiving a second response that is responsive to the first challenge, the second response comprising a second cryptogram, wherein the second cryptogram is generated using the first challenge in combination with one or more private card keys, and comprises the secret salt;
authenticating the second response by:
  decrypting the second cryptogram, and
  validating the decrypted second cryptogram using a session key by comparing the secret salt from the second cryptogram with a reference secret salt; and
transmitting, to a client device, one or more authentication messages as a result of the validation of the decrypted second cryptogram.

\* \* \* \* \*